May 3, 1938.  R. J. KEHL  2,116,352

WELDING AND CUTTING APPARATUS

Filed July 13, 1932

INVENTOR
Robert J. Kehl
by E. L. Freenewald
ATTORNEY

Patented May 3, 1938

2,116,352

UNITED STATES PATENT OFFICE 2,116,352

WELDING AND CUTTING APPARATUS

Robert J. Kehl, Bayside, N. Y., assignor, by mesne assignments, to Union Carbide and Carbon Corporation, a corporation of New York Application July 13, 1932, Serial No. 622,177

7 Claims. (Cl. 158—27.4)

This invention relates to blowpipes for use in welding or cutting metals and has more particular application to the construction of hand operated blowpipes whereby they may be adapted to more varied uses than has been heretofore possible.

In the ordinary use of hand operated blowpipes for welding and cutting, it has been customary and, under certain circumstances, highly desirable to have the valves controlling the flow of fluids to the blowpipe head located at the rear end of the handle. In recent years, however, new fields of welding activity have developed in which it is desirable that these valves should be located at the forward end of the handle and in constant sensitive control of the hand of the operator by which he supports the blowpipe. Frequently, in the same shop, it is desirable to have the valves at one end or the other of the blowpipe handle to suit the different conditions met with in different jobs or the particular preferences of several operators using the same blowpipe. Typical of jobs in which it is desirable to have the control valves located at the forward end of the handle is the welding of joints between thin walled steel tubing as in the manufacture of airplane fusilages where careful and delicate manipulation of the valves is necessary if satisfactory results are to be obtained.

In order that the same blowpipe apparatus may be employed to advantage in various situations such as referred to above, and in order to avoid the necessity of providing special blowpipes for each of such situations, it is desirable and therefore an object of this invention to provide a novel blowpipe construction in which the position of the valves for controlling the flow of fluid to the head may be reversed so as to position them either at the forward or rear end of the blowpipe handle as may be desired.

In accordance with this invention, a handle for the blowpipe may be provided having its ends of identical contour and adapted to interchangeably interfit with ends of elements of the blowpipe construction also having identical contours; the handle and the said elements having passages therethrough opening in their ends in identical positions and under control of valves located at one end of the handle.

Other objects and novel features of the invention will be made apparent from the following specifications taken with the accompanying drawing in which, Fig. 1 is an elevational view of a blowpipe constructed in accordance with this invention.

Figure 1:
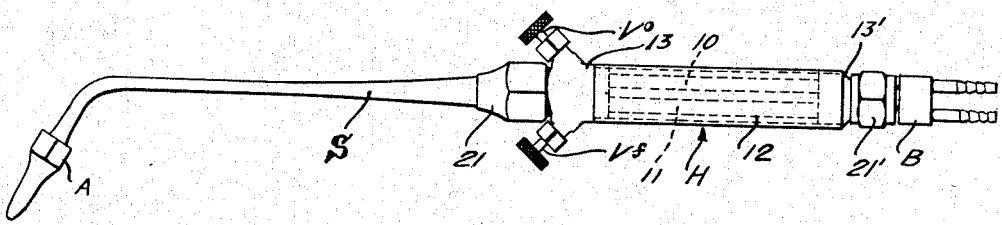
Figure 2:
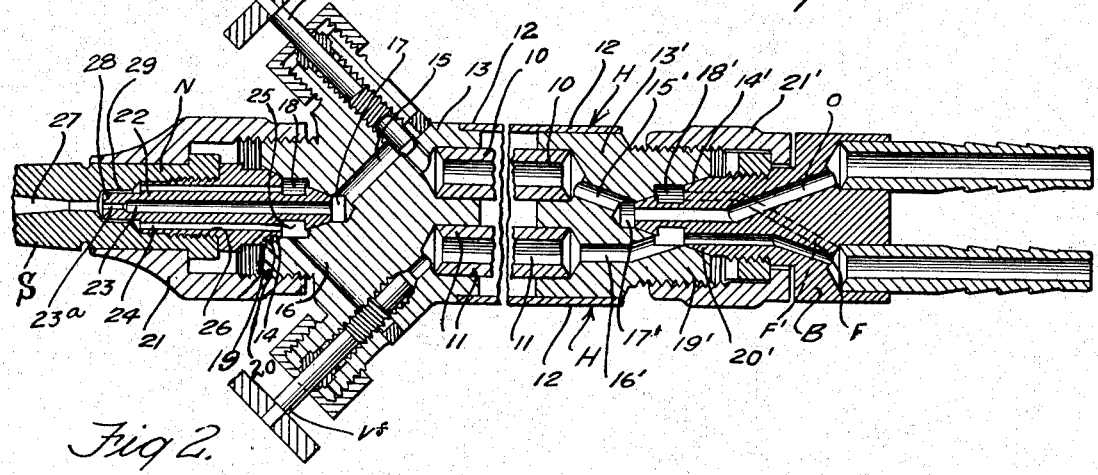
Fig. 2 is a fragmentary view in longitudinal section and on an enlarged scale compared with Fig. 1; showing the handle assembled with the related parts and the valves located at the forward end of the handle assembly.
Figure 3:
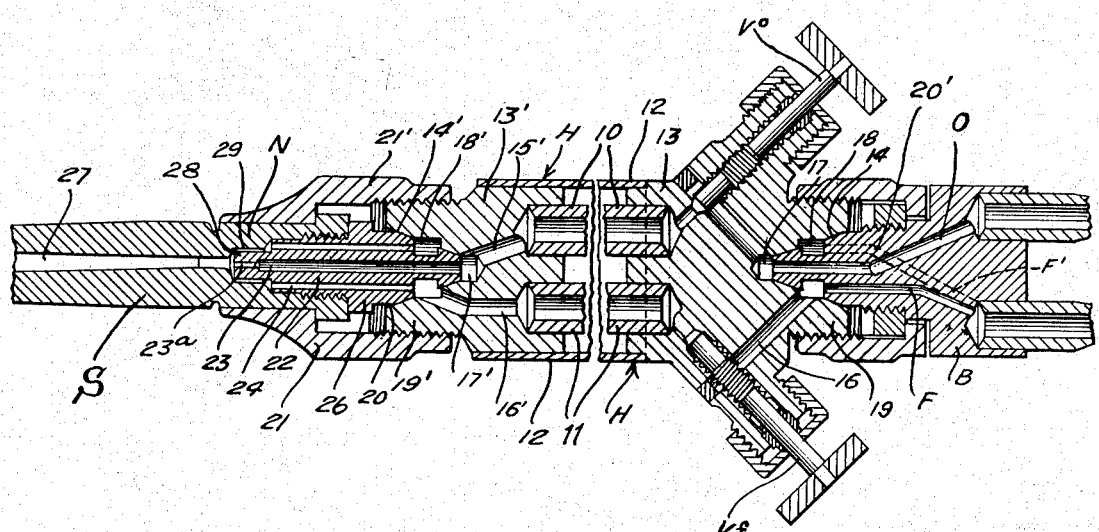
Fig. 3 is a view similar to Fig. 2 showing the valves at the rear end of the assembly.

For the purpose of disclosing the principles of the invention, the same is herein shown and described as embodied in a welding blowpipe. Referring to the figures of the drawing in detail, a handle H is shown as having a hose attaching block B connected to its rear end and a nozzle supporting block N at its forward end, to which latter, is secured a stem S by which the nozzle carrying head A is supported.

The handle H is provided with conduits 10 and 11 extending therethrough and the flow of oxygen and fuel gases through these conduits for providing a combustible mixture is under control of valves V° and V$^f$ located adjacent one end of the handle in a valve block 13 which serves as a plug to close one end of the hollow handle casing 12; the handle casing serves to protect conduits 10 and 11 and affords a convenient hand grip by means of which the apparatus may be supported. The other end of the casing is closed by a plug 13'; and these plugs are provided at their outer ends with identically shaped recesses 14 and 14' which are coaxial with the handle, preferably of conical shape, and positioned to face in opposite directions. The valves V° and V$^f$ are preferably positioned at an angle to the handle so as to extend forwardly or rearwardly according as they are positioned at the forward or rear end of the handle assemblage; the angle at which the valves are placed being such that when located at the forward end of the assemblage they may be readily manipulated by the thumb or fore finger of the hand with which the operator supports the torch and to this end an angle of about 45° to the handle is found convenient.

The plugs 13, 13' are provided with pairs of passages 15, 16 and 15' and 16' connected with conduits 10 and 11 and leading to separate and corresponding points in the respective recesses 14, 14'; passages 15, 15' connecting with conduit 10; and passages 16, 16' with conduit 11. Conveniently, passages 15, 15' may connect the conduit 10 with depressions 17, 17' at the bottoms of the recesses 14 and 14' while the passages 16, 16' may connect conduit 11 with the annular depressions 18, 18' formed in the walls of the recesses 14, 14' at points spaced from depressions 17, 17'.

The recesses 14, 14' are preferably located as shown in extensions 19, 19' of the plugs 13, 13' and the nozzle supporting block N and the hose attaching block B are provided with extensions 20, 20' respectively of identical contour, corresponding to and adapted to be interchangeably and snugly received in the recesses 14, 14'. The blocks N and B are adapted to be secured to the plugs 13 and 13' by threaded connections between sleeves 21, 21', swiveled respectively to blocks N and B, and extensions 19, 19'. The threaded bores of the sleeves 21, 21' are of the same diameter and threading as are also the extensions 19, 19' so that these connections are interchangeable as will readily appear.

The hose attaching block B is provided with an oxygen passage O and a fuel passage F opening through extension 20' so as to coincide in position to the passages 15 and 16 or 15' and 16' as the case may be, and passage F may be supplemented by a further passage F'' formed in the block B where it is impossible to provide a single drilling sufficiently large to supply the required quantity of fuel gas as is usually the case in constructions of this character.

The conical projection 20 may be conveniently formed integrally with a mixing nozzle 22 having a central bore 23 therethrough connected, when the blowpipe handle is assembled, either with passage 15 or 15' and side passages 24 paralleling bore 23 and communicating with passages 16 or 16', according to which end of the handle is connected therewith. The passages 24 are connected to passages 16 or 16' through an annular recess 25 formed in projection 20 and recess 18 or 18' constituting together an annular distributing chamber when the nozzle supporting block is assembled with the handle.

The mixing nozzle 22 may be removably connected in the nozzle supporting block N as by a threaded connection at 26 and the gases of combustion are mixed preferably at the forward end of the nozzle 22 in the chamber 27 before passing to the tip or head A; gas from bore 23 discharging through the orifice 23a and that from passages 24 passing around the end of the nozzle 22 through the annular passage 29 surrounding the reduced diameter portion 28 of the nozzle 22.

From the above description, it will appear that the nozzle supporting and hose attaching blocks may be interchangeably connected with either end of the handle or, in other words, the handle may be reversed in position with respect to these two members and thereby the valves V¹ and V° may be located at either the forward or rear end of the handle as assembled with the other elements making up the blowpipe construction. In this manner the valves may be positioned to best suit the convenience of the operator and to the various requirements of the work at hand and the necessity of providing a plurality of blowpipes to suit the preference of various individuals or the different requirements of various jobs may be avoided.

It will be understood that numerous changes may be made in the details of construction herein disclosed without departing from the spirit of the invention or sacrificing any of its advantages.

I claim:

1. The combination of a handle having gas passages therethrough; valves controlling said passages and mounted on said handle closer to one end of the latter than to its other end; means for supplying gas to said passages; means so constructed and arranged that such gas supplying means may be coupled at will to either end of said handle to supply gases to said passages; a nozzle supporting member; and means so constructed and arranged that said member may be coupled to either end of said handles.

2. The combination of a handle having separate gas passages therethrough; valves controlling said passages and mounted on said handle closer to one end thereof than to its other end; means for mixing the gases delivered by said passages; and means so constructed and arranged that such gas mixing means may be coupled at will to either end of said handle to receive gases from said passages.

3. In a blowpipe, the combination of a handle having separate gas passages therethrough terminating adjacent the ends of said handle; valves for controlling said passages and mounted adjacent one end of said handle; a gas-supply device having gas passages adapted to register with the ends of the gas passages at either end of the handle; a gas-mixing device having gas passages adapted to register with the ends of the gas passages at either end of the handle; and means whereby said devices may be coupled at will and interchangeably to either end of the handle, to locate said valves either adjacent to the supply device or adjacent to the mixing device, as desired.

4. In a blowpipe, the combination of a handle having independent gas passages therethrough terminating at the ends of said handle; means carried by said handle for controlling the flow of gases through said passages; a gas-supply device constructed to be operatively coupled to either end of said handle to supply gas to said gas passages; and a gas-delivery device constructed to be operatively coupled to either end of said handle to receive gas from said gas passages.

5. In combination, a blowpipe handle having valve means adjacent one end thereof, the opposite ends of the handle having identical contours; a nozzle block; and a hose block, said blocks being connectible interchangeably with the ends of the handle.

6. In combination, a blowpipe handle, a nozzle support and a hose block; said handle, nozzle support and block each having passages therethrough; the handle having identically shaped ends and the passages through the handle each having both of its ends opening at identical positions in said ends; said nozzle support and block each having an end complementarily shaped to interchangeably connect with the ends of the handle; and the passages through the head and block opening at the ends thereof to coincide and connect with openings of the conduits through said handle; and valves adjacent one end of the handle for controlling the flow of fluid through the passages therein.

7. In combination, a blowpipe assembly including a handle having conduits therethrough and valves positioned nearer one end of said handle than the other for controlling the passage of fluid through said conduits; nozzle supporting means and hose attaching means connected with said handle; said handle being reversible with respect to said nozzle supporting means and said hose attaching means, to position said valves either adjacent the forward end or the rear end of said assembly.

ROBERT J. KEHL.